United States Patent
Fotta

(10) Patent No.: US 8,577,005 B2
(45) Date of Patent: Nov. 5, 2013

(54) AUTOMATIC REPORTING OF UNWANTED OR UNLAWFUL TELEPHONIC COMMUNICATION

(75) Inventor: Keith Alan Fotta, Duxbury, MA (US)

(73) Assignee: First Orion Corp., Conway, AR (US)

( * ) Notice: Subject to any disclaimer, the term of this patent is extended or adjusted under 35 U.S.C. 154(b) by 1029 days.

(21) Appl. No.: 12/496,287

(22) Filed: Jul. 1, 2009

(65) Prior Publication Data

US 2010/0172482 A1    Jul. 8, 2010

Related U.S. Application Data

(63) Continuation-in-part of application No. 11/550,496, filed on Oct. 18, 2006.

(51) Int. Cl.
*H04M 3/42* (2006.01)
*H04M 3/00* (2006.01)

(52) U.S. Cl.
USPC ............. 379/207.02; 379/210.02; 379/249

(58) Field of Classification Search
USPC ............. 379/210.02, 196, 197, 207.02, 249
See application file for complete search history.

(56) References Cited

U.S. PATENT DOCUMENTS

| | | | |
|---|---|---|---|
| 6,009,321 A * | 12/1999 | Wang et al. ............... | 455/410 |
| 6,453,019 B1 | 9/2002 | Latter et al. | |
| 6,765,994 B2 | 7/2004 | Latter et al. | |
| 6,771,950 B1 | 8/2004 | Shupe et al. | |
| 6,782,268 B1 | 8/2004 | Thompson et al. | |
| 6,823,060 B1 * | 11/2004 | Adams et al. ............... | 379/229 |
| 6,853,717 B1 | 2/2005 | Frentz et al. | |
| 6,990,187 B2 | 1/2006 | MacNamara et al. | |
| 7,068,761 B2 | 6/2006 | Latter et al. | |
| 7,162,225 B2 * | 1/2007 | Ranta ............... | 455/414.3 |
| 7,283,969 B1 * | 10/2007 | Marsico et al. ............... | 705/346 |
| 7,552,058 B1 | 6/2009 | Zhang | |
| 2002/0085700 A1 | 7/2002 | Metcalf | |
| 2004/0266413 A1 * | 12/2004 | Bronstein ............... | 455/415 |
| 2006/0182029 A1 | 8/2006 | Kealy et al. | |

OTHER PUBLICATIONS

Srivastava, K., et al., Preventing Spam for SIP-based Instant Messages and Sessions, [online] Oct. 28, 2004, Retrieved from the Internet URL: http://www.cs.columbia.edu/techreports/cucs-042-04.pdf retrieved on Oct. 16, 2009.

Dantu, et al., Detecting Spam in VoIP Networks, SRUTI: Steps to Reducing Unwanted Traffic on the Internet Workshop, XP002405070, pp: 31-37 (2005).

* cited by examiner

*Primary Examiner* — Duc Nguyen
*Assistant Examiner* — Sonia Gay
(74) *Attorney, Agent, or Firm* — Gottlieb, Rackman & Reisman PC

(57) ABSTRACT

The present invention is directed to methods for a called party to report unwanted telephone calls to jurisdictional authorities. These calls may be unwanted, unlawful, or other calls. In the methods of the present invention, the called party dials a code comprised of a series of digits, which triggers the switching node associated with the called party to generate a series of messages, at least one of which encompasses the originating telephone number of the unwanted call. At least one of the messages is directed to the proper reporting authority such that the called party reports the unwanted event. Called parties can take further actions, such as including additional messaging or blocking subsequent calls from the calling party number. The reporting authority can take further action as well, such as matching the called party number with subscriber or geographic information.

19 Claims, 8 Drawing Sheets

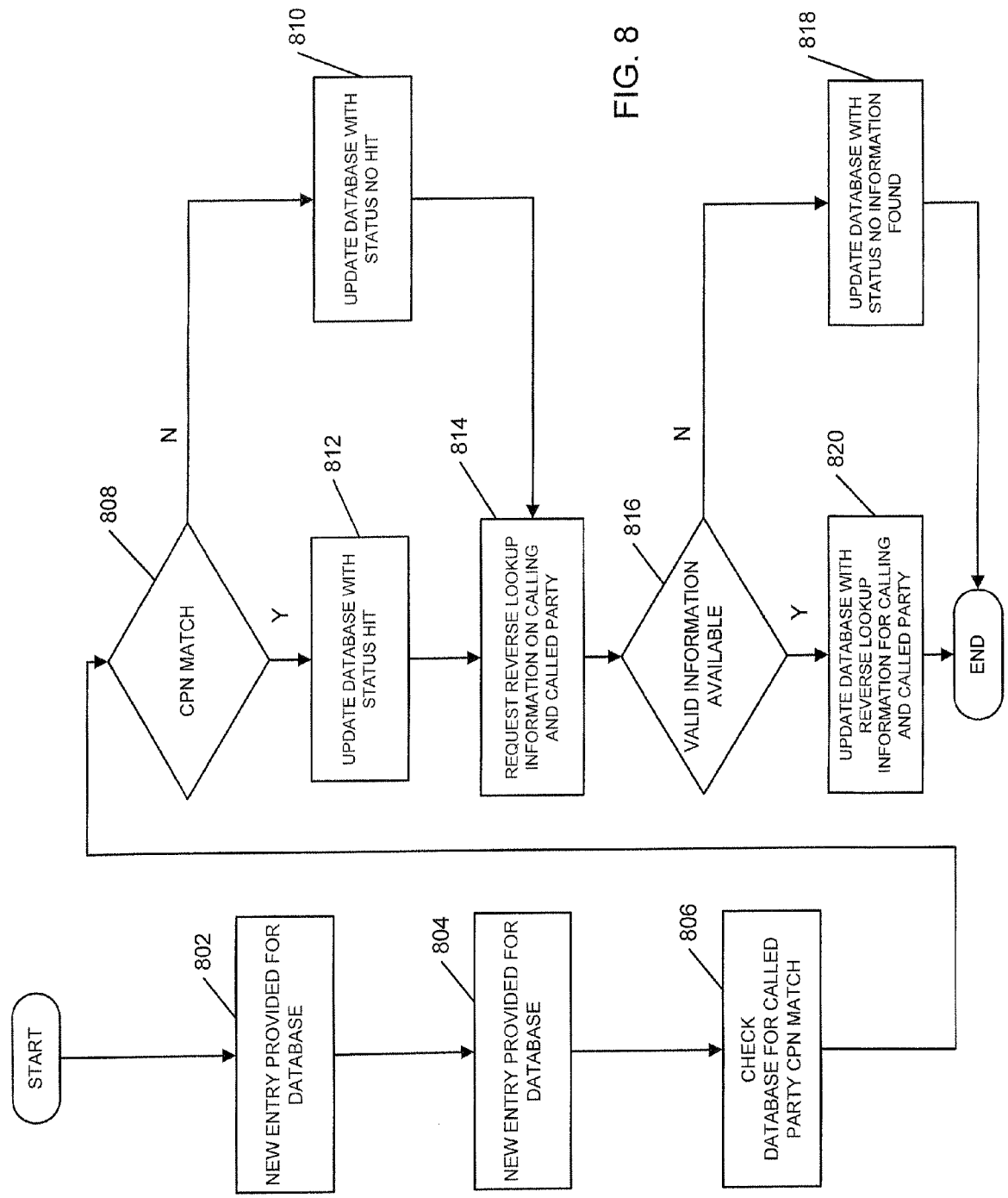

AUTOMATIC REPORTING OF UNWANTED OR UNLAWFUL TELEPHONIC COMMUNICATION

This application claims priority to and is a continuation-in-part of U.S. patent application Ser. No. 11/550,496, filed Oct. 18, 2006, presently pending.

BACKGROUND

The Public Switched Telephone Network (PSTN) provides a vehicle for any subscriber to telephonically connect with any other subscriber. As any calling party can place a call to any called party, a calling party can place unwanted communications to others. Such unwanted communications may constitute a violation of telemarketing laws, may constitute a crime, as in the case of a bomb threat, or may be placed to further other unlawful activity. A single caller may place thousands of unwanted and unlawful communications, as auto-dialing capability facilitates callers ability to call more frequently and at inappropriate times of day. These unwanted or unlawful calls may cause harm to persons and/or property.

As a result of the ease and anonymity involved in telephonic communication, it has increasingly become a preferred method for bad actors to engage in or support unlawful activity. Complaints regarding unwanted or unlawful telephonic communications such as harassing, threatening, and telemarketing phone calls, faxes and pre-recorded messages have led to significant federal and state laws and regulations to protect subscribers from these abusive practices. Similar laws and regulations exist or have been proposed in other countries, including Canada, Australia, Mexico, and countries in the European Union. In addition, because these types of calls are harbingers of later harm, consumers may subsequently need a record of such events and/or physical protection as a consequence of unwanted calls.

Preferably, called parties would report unwanted or unlawful calls to jurisdictional authorities and these authorities would respond as necessary and appropriate. However, beyond merely reporting that an unwanted or unlawful calling event occurred, called parties may have little additional useful or meaningful information which authorities can use to take action against the caller. Although caller ID capability generally may provide called parties with originating telephone numbers, not all called parties subscribe to caller ID service, and calling parties have means available to them for spoofing numbers that do not belong to them or blocking delivery of their numbers even when caller ID delivery service is used by the called party. Therefore, in the event of an unlawful communication, the called party may not have direct access to the calling party number (CPN) in order to report it. However, the number is stored in a designated location in the public network. Since the CPN is stored in the public network, it may be accessible by a called party without actually being visible to the called party.

Local switching standards and requirements obligate telephone service providers to deliver and store CPN in most circumstances. Often, CPN can be "seen" by a subscriber if the subscriber is provided with Caller ID delivery service. That is, when a subscriber to Caller ID service receives a display of the calling party's telephone number and/or name, that number is the number used to populate the CPN Register. Because CPN is delivered even if the called party does not subscribe to Caller ID service, the local switch always has the most recent CPN in memory.

For legal, regulatory, and/or technical reasons, certain information about each complete or incomplete call attempt (a call where the called party does not answer) remains stored in memory for at least some period of time. For example, for billing purposes, call information, including parameters such as originating and terminating telephone numbers and call duration, is captured within the public network, typically at the originating end, for delivery to a Revenue Accounting Office (RAO) within the internal network of the originator's service provider (or equivalent). In at least some cases, these data are aggregated at the originating end and transferred in bulk to the RAO at a convenient time. Some parameters, such as CPN, remain stored at the terminating end, but only temporarily.

Unwanted or unlawful calls can range from simple pranks to significant threats to individual property and public safety. The earlier in time law enforcement obtains detailed information about the caller placing the unlawful call, the more likely that the risk of harm can be reduced. Without the ability to provide meaningful data to law enforcement authorities of such events at or near the time they happen, law enforcement officials are limited in their abilities to rapidly enforce laws against unlawful communications or to identify the calling party and the calling party's location.

In addition, certain laws or regulations, such as the United States Federal Trade Commission's (FTC) Telemarketing Sales Rules, require that a business maintain a list of telephone numbers for consumers who express a desire not to be solicited by telephone, known as a "Do-Not-Call" (DNC) list, and take appropriate measures to ensure that outgoing calls to telephone numbers on DNC lists are blocked. The DNC lists may include one or more lists specific to a particular business, as well as state-wide, national and industry-imposed lists such as the Direct Marketing Association Telephone Preference Service list. Other DNC laws may define how, when, to whom and under what conditions consumers and businesses may be contacted. A single violation of a federal or state DNC regulation can result in a substantial fine.

Generally speaking, laws exist in many jurisdictions to deter or punish unwanted and unlawful callers. Despite the existence of such laws, many violations occur and go unreported on a daily basis due to the often complicated effort required to obtain calling party data and to file a complaint with the appropriate jurisdictional authority. In most cases the complaining party must initiate the complaint with law enforcement, which may require CPN information or the name of a caller in order to accept a complaint. This problem is compounded when a caller does not identify themselves, misidentifies themselves, the called party does not subscribe to caller ID service or the stored CPN changes because of a later call. In practice, the requirement that a person being called must know where to file the complaint, capture the required information that may not be available to them, and take the time to actually file the complaint, eliminates all but a very small percentage of viable and enforceable complaints. Currently there is no system whereby the complainant can be assured that law enforcement receives available CPN data directly before the data are destroyed through the normal course of business and in a timely manner that allows law enforcement to quickly identify, locate and act on unlawful activity.

SUMMARY

The present invention is directed to methods and associated systems used to facilitate reporting data to jurisdictional authorities regarding unwanted or unlawful communications so as to more easily, more quickly, and more comprehensively allow consumers to identify and report such events to third parties and to file complaints against unwanted and unlawful callers. The present invention also enables the capture and delivery of CPN and physical location of a calling party, even though normal operation of the POTS, voice over internet protocol (VoIP), cable, satellite phone, smart phone or other mobile device, including cell phone systems, does not present that information to the called party. The present invention also includes the ability to leverage requisite embedded functionality of local switches, common channel signaling (CCS) and associated Signaling System 7 (SS7) network (and other network) and its elements, as well as abilities that may reside with law enforcement or other third parties. In particular, the present invention discloses a new service feature implementation, referred to herein as "threat reporting," in which data regarding an unlawful or unwanted call is captured and a parameter, ordinarily temporarily stored in memory, is automatically delivered to jurisdictional authorities while the parameter is in memory and before it is overwritten.

The present invention also leverages the ability of telephonic switching nodes to prepare protocol-compliant signaling messages for a variety of purposes. During call set up, a message protocol is established between an originating switch and a terminating switch. In that messaging protocol, one parameter, CPN, is identified, populated in a signaling message and delivered to the terminating end. As described in telecommunication standards, this parameter is stored at the terminating end, typically in a register at the terminating local switch, or elsewhere in a register in equipment associated with the terminating side of the call. One CPN register exists for each subscriber number, but the CPN register only maintains the most recent called party number for each subscriber. The number in a CPN register is overwritten each time a called party receives a new call.

In addition, on the subscriber side, switching nodes today may be programmed to recognize user-entered signaling codes, such as Dual Tone Multi Frequency (DTMF) signaling codes, and to act upon them. These codes and node responses are often referred to as calling features. Particular calling features may be activated periodically by different subscribers, such as by entering DTMF signaling codes. For example, many service providers have an available feature often known as "automated callback," wherein a subscriber dials a pre-assigned code (including at least one of the asterisk or pound sign) to call the subscriber's most recent calling party.

These calling features use abilities resident in these switching nodes. For at least some of these calling features, the switching node performs call set up functions including network signaling functions. For example, if a subscriber activates the automated callback calling feature, the switching node extracts CPN from a register and sends an SS7 call set up message to one of its associated Signal Transfer Points with the content of the CPN register populating the destination address of the SS7 message. Ultimately, the call may then be completed across the PSTN.

The present invention leverages the capabilities described above to provide public safety or privacy benefits. In the present invention, upon receiving an unlawful call, a called party dials a service feature code (SFC), such as *911, to activate a new calling feature. Additional SFCs can be used for additional purposes, such as a SFC assigned to allow a consumer to report a telemarketer violation of the Do Not Call list. For example, one SFC may be assigned for reporting unwanted telemarketing calls and another SFC may be assigned to report unlawful calls involving criminal activity. As can be appreciated, many SFCs may be assigned and a consumer dialing any one of the SFCs may trigger different events. Upon recognizing a particular dialed service feature code, the local switch begins a particular series of events. The present invention is directed to methods for formulating messages, forwarding data and voice calls, and capturing user data in the context of certain calls.

With regard to a public safety application, once the called party dials a pre-assigned SFC, the local switch may launch a query into a database to determine the jurisdictionally appropriate law enforcement bureau, such as a Public Safety Answering Point (PSAP), which should be contacted. Alternatively, the local switch may contain information regarding the subscriber's jurisdictionally appropriate law enforcement bureau. The switch can establish a voice-path communication, a text-based message, or both. The formulated message could include information regarding the duration of call and the time and date of the call. The formulated message includes both the CPN and the called party's (now initiating party's) telephone number. A voice message may also be recorded for delivery as well. A more detailed data message, such as an email or a user-populated form, may also be prepared and delivered. Once text and/or voice messages are received by the law enforcement bureau, a database look up can provide law enforcement with name and address information associated with the CPN. Should the called party choose to report an unwanted or unlawful call, law enforcement can access additional data at its disposal to identify the name and address of the owner of the calling number and can use other technological techniques to identify the location of the calling party. Still further, for wireless CPNs, once the law enforcement bureau is aware of the CPN, the law enforcement bureau can identify the location of the telephone, satellite phone, smart phone, or other communication device associated with CPN through a global positioning system (GPS) search or through a triangulation methodology. Still other databases can be accessed which are not a part of the law enforcement bureau. In addition, because of differing laws in different jurisdictions, the resultant events may differ by location.

In an embodiment of the present invention, a method is provided comprising capturing and forwarding to law enforcement called party and call data upon call completion. In an additional embodiment, the reporting party may be provided with the option to record a voice message or prepare a text-based message to be delivered with or in parallel to the report. If delivered in parallel, the path may be a data path wherein the data path may be initiated directly by a subscriber device, such as a smart phone, when the device includes such capability. In an additional embodiment of the present invention, the called party and/or call data are used to report an unwanted or unlawful call, which can later be augmented by the called party for completion. In an additional embodiment of the present invention, upon receiving call information to record a complaint from a called party against a calling party, the call may be added to a complaint database and also forwarded to a call rejection database, wherein the database is configured to indicate blocking of further calls from the calling party to the called party. Calls directed to the called party (or calls from the calling party or both) may be held for a database query to determine if blocking is in effect. Among other things, the complaint information may include the directory numbers of both the called party and the calling party. In addition, in many circumstances, either because of regulation or service provider demands or concerns, call records for calls are generated and captured for later delivery to a RAO within a service provider's network. These call records may include information regarding the originating, terminating, and billing numbers, call times and duration, and other information. Generally speaking, these records may be retained by service providers and can later be examined. The complaint information may subsequently be matched to an associated call record, which may be available at the switching node or a RAO.

In an additional embodiment, citations can be sent to the calling party based upon a variety of attributes, such as upon the number of received complaints exceeding a threshold. In the preferred embodiment of the invention, upon receiving a call which the called party believes to be unlawful or unwanted, the called party performs an action, such as dialing an intelligent network service feature code.

In another embodiment of the present invention, the called party's action concurrently results in adding the calling party to the called party's rejection list and further calls to the called party from the calling party are blocked in the network. In some embodiments, the change in status may be prompted by a called party from a telephone, satellite phone, smart phone or other communication device, VoIP terminal or web interface.

In another embodiment, the called party can supplement the report of an unwanted or unlawful call with additional information, and the information can take the form of text, voice, or both. Further to this embodiment, a device in the network can "match" the report with the additional information.

Still further, a switching node, which is capable of preparing a message to something other than another switching node, can prepare and deliver a message as a response to a subscriber dialing the code for an implemented calling feature. A switching node can launch a query into a database associated with or contained within its SS7 network. For example, if a subscriber dials an 800, 888, 877, or 866 number, the local switching node accepts the digits from the subscriber and prepares an SS7 message for delivery to an SCP database in order to obtain a network address for the dialed phone number. The switching node can then formulate a second message which includes the network address (or an entry representing the network address) for delivery to a third party.

In another embodiment, when the called party reports the unwanted call from the calling party, later calls from that calling party may be blocked before reaching the called party. This call block may be implemented automatically, upon initiation by the called party, in response to the option being made available to the called party, or on a call by call basis.

In addition, many jurisdictions have implemented E-911 services. These E-911 services, intended to aid community residents by providing rapid response to emergencies, presently contain databases which match telephone numbers with names and addresses. Today, E-911 service centers have Caller ID delivered and have the ability to match an address to the Caller ID. In the event CPN is delivered to an E-911 service center, the E-911 service center may have the capability to match the CPN with a name and address.

Still further, if an E-911 service center is provided with the called number of a wireless caller, an E-911 service center may be capable of identifying the geographic location of a smart phone or wireless communication device even without the wireless caller being on the call. Two different techniques may be used for geographic location. The E-911 service center may use Global Positioning System (GPS) techniques to find the telephone, smart phone, or other communication device, alternately or complimentarily, may use triangulation techniques.

In an additional embodiment, once the calling party number is delivered to a third party, such as a law enforcement call center, the third party can use its resources to match the calling party number with additional data regarding the calling party, such as the calling party's name and address or, in the event of a mobile caller, the caller's geographic location. Generally speaking, law enforcement call centers have the ability to identify the location of a mobile device through a GPS locator or a form of triangulation.

BRIEF DESCRIPTION OF THE DRAWINGS

The foregoing and other features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 illustrates a flow chart for matching and updating a database.

DETAILED DESCRIPTION

Figure 1:
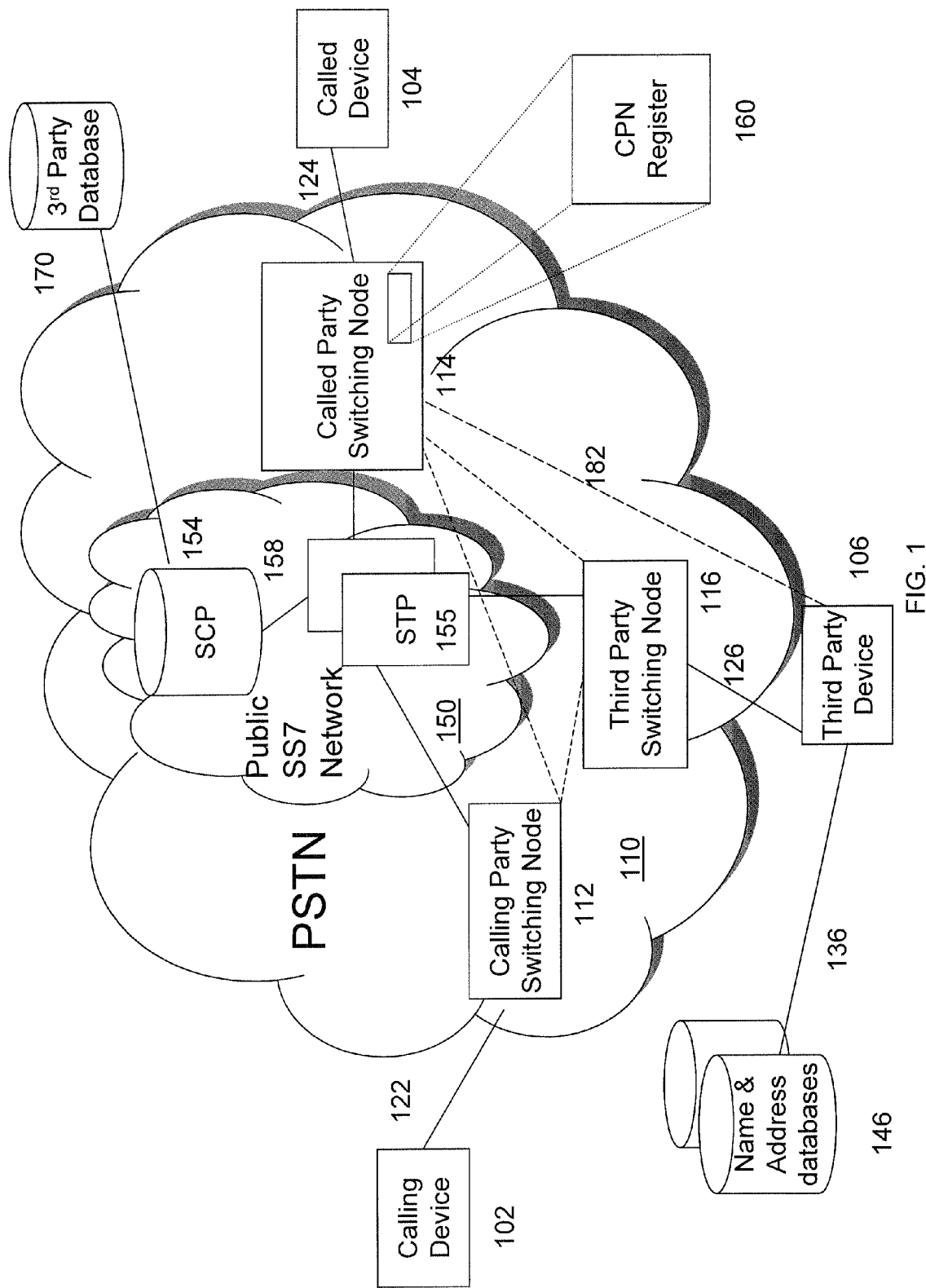
FIG. 1 illustrates embodiments of a communication system.

FIG. 1 illustrates a representative communication system using the PSTN in order to illustrate principles of the present approach. It is also understood that the present approach may be applied to any network capable of providing a communication connection between an origin and destination. FIG. 1 is intended to display a wireline-to-wireline call as an example of an end-to-end network. As shown in FIG. 1, the end-to-end network includes an out-of-band signaling network and, in particular, the out-of-band signaling network in the example is a Signaling System 7 (SS7) network. Calling device 102, called device 104, and third party device 106 connect to telecommunication network 110 through respective switch nodes 112, 114, and 116. In the example shown in FIG. 1, network 110 is the public switched telephone network (PSTN) and may be understood to include switch nodes 112, 114, and 116.

Calling device 102, called device 104, and third party device 106 represent communication devices such as wireline telephones, wireless telephones, satellite phone, smart phones or devices such as data-capable devices, facsimile machines, Private Branch Exchanges (PBXs), and answering machines, but may also represent automated dialing, texting/SMS, and calling devices. For purposes of example, the device 102 is referred to as "calling device," indicating that it is the device that originates a call. Likewise, device 104 is referred to as "called device," indicating that it is the device that receives the call. For example, calling device 102 may be a PBX with traditional station sets.

Calling device 102 and called device 104 connect via links 122 and 124 to switch nodes 112 and 114 respectively. The switch nodes may include local processing switches, often referred to as central office switches. A central office switch may comprise any class 5 switch, for example, which includes memory and processor elements for storing and executing software routines for call processing, including providing access to the network 110 and various call features. In an embodiment, nodes 112, 114, and 116 each include a dual-tone multi-frequency (DTMF) receiver for receiving and processing DTMF signals sent from devices 102, 104 and potentially 106.

In addition, in the example communication systems shown in FIG. 1, switching nodes 112, 114, and 116 are shown as single entities. However, it is understood that such switch nodes may include multiple physical switches. It is also understood that, depending on the relative locations of the calling party and the called party, switch nodes 112, 114, and/or 116 may be one and the same switch node.

PSTN 110 may be implemented using any appropriate transmission, switching and routing technologies, including but not limited to Internet Protocol (IP), Asynchronous Transfer Mode (ATM) and SS7. In particular, call set up and routing by switches relies, at least in part, on out-of-band signaling, such as the public SS7 network 150 and, therefore, STPs 155 contained within public SS7 network 150. Public SS7 network 150 also is comprised of at least one service control point (SCP) database 154, itself connected to STPs 155 by link 158.

As can be seen in FIG. 1, PSTN 110 is considered to include a Signaling System 7 (SS7) network comprised of Signaling Transfer Points (STPs) 155 for signaling between switching nodes 112, 114, and 116. A Service Control Point (SCP) database 154 is also accessible through PSTN 110 using public SS7 network 150. PSTN 110 includes SS7 network 150 with STPs 155 operable to receive and transfer signals from switch nodes 112, 114, and 116. STPs 155 also provides communication to a Service Control Point (SCP) database 154 via link 158. SCP 154 is a standard component of an intelligent network telephone system which is used to control service. Traditionally, SCP 154 is operated through a query response system. Queries are formulated elsewhere in the PSTN, typically at a switching node, directed to a particular SCP. The SCP associates data with a particular telephone number and returns the data based upon the queried telephone number. Different SCPs may maintain different types of data. The types of data which may be maintained by the SCP, may include telephone number translations, call forwarding information, and jurisdictional information. Under the query response approach of the present invention, the SCP captures information which is used to populate a message directed to jurisdictional authorities. SCP 154 may be deployed using any or all of SS7, Sigtran, Session Initiation Protocol (SIP) IP technologies.

In addition, Third Party Database 170 is a private database which captures and stores information generated by called parties, such as the information included in the SFC messages. It may be desirous to store all such information in a separate database, so that data searching techniques may later be employed for investigating attributes of calls, such as by performing trend analysis. Although shown as accessible from SCP 154, third party database 170 may also be accessible directly from STPs 155.

CPN Register 160 is one of potentially several registers residing in a switch node. One CPN Register 160 is reserved for each subscriber and each contains the calling party number of the most recent caller to that subscriber, regardless of whether the call actually completed. CPN Register 160 is overwritten each time a call is delivered to the subscriber. In general, and as shown in FIG. 1, CPN Register 160 is resident in Switching Node 114, however, in other applications, it may reside elsewhere, such as within a wireless network's home locator register (see FIG. 3).

Once a subscriber activates the service feature associated with the present invention, a call, a message, or both are directed to Third Party Device 106 using line 126. Third Party Device 106 may be any device which receives telephonic communication, data messages, or both, such as but not limited to a traditional station set, a computer, a PBX, or a call center. Once Third Party Device 106 receives the forwarded CPN, it forwards a message over link 136 to database 146 to match CPN to other pertinent information, such as the name and address associated with the forwarded CPN.

Figure 2:
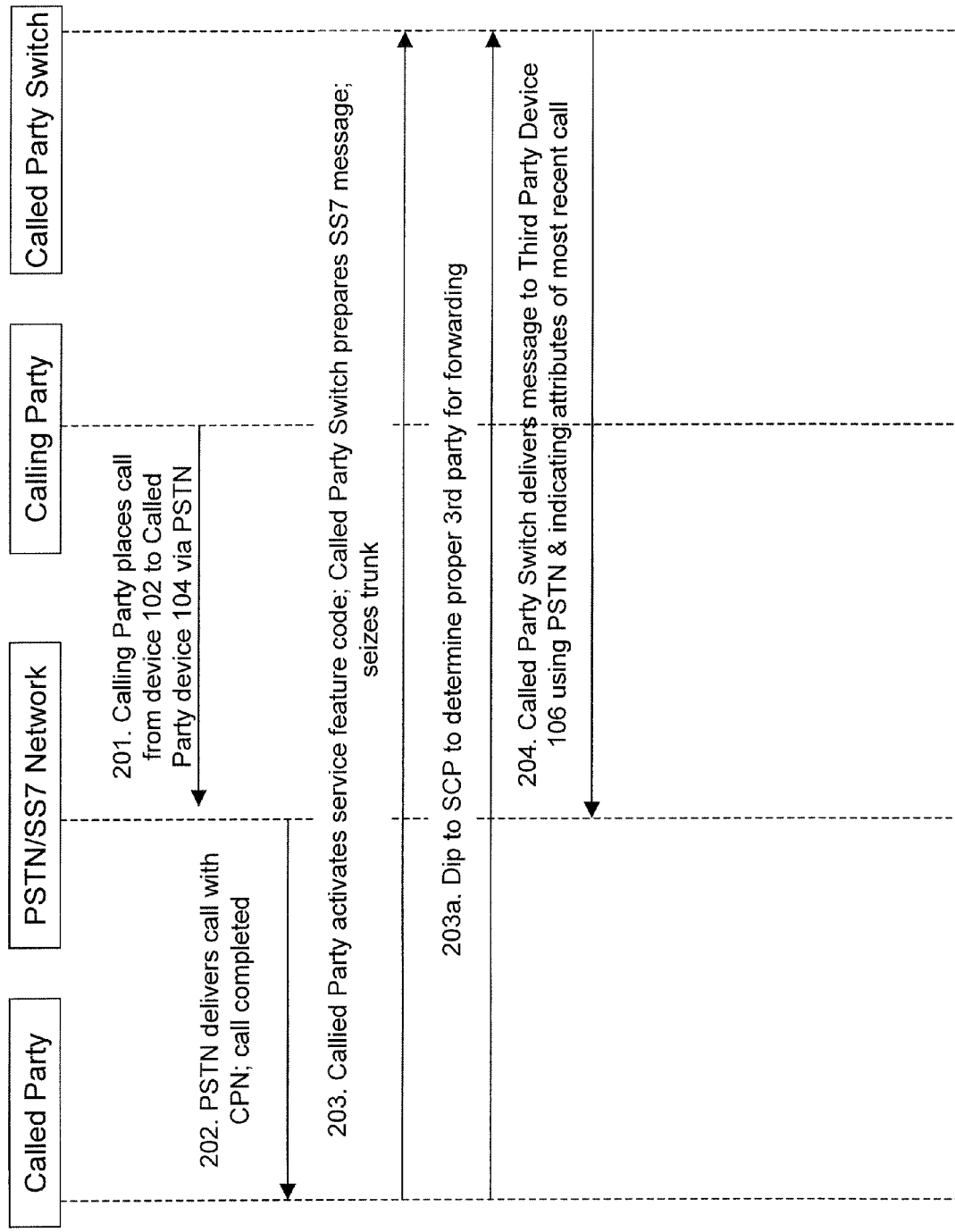
FIG. 2 illustrates an example call flow for the communication system of FIG. 1.

FIG. 2 illustrates an example call flow relating to a method that may be implemented in the communication system of FIG. 1 to provide for automatic delivery of CPN and additional call data. In FIG. 2, the call flow illustrates interactions associated with calling device 102, called device 104, PSTN network 110, and Third Party Device 106.

Third Party Device 106 can accept the requisite content in any of several ways. For example, if Third Party Device 106 has the ability to serve as a node on the public SS7 network (that is, it has its own Common Channel Signaling interface), the content can be embedded in one or more SS7 messages. Alternatively or in addition, if Third Party Device 106 is internet ready, Called Party Switching Node 114 can prepare a datagram directed to Third Party Device 106 delivered over internet line 182. If delivered in parallel, the path may be a data path wherein the data path may be initiated directly by a subscriber device, such as a smart phone, when the device includes such capability.

Referring to FIGS. 1 and 2, in the first interaction, a harasser (calling party) places a call 201 to a consumer (called party) over PSTN 110 by dialing the called party's assigned telephone number, e.g., 617-555-XXXX. Next, the PSTN delivers the call 202 to the consumer, with CPN delivered to Called Party Switching Node 114, which is placed in CPN Register 160. Assuming the called party wishes to report the call as threatening or harassing, the called party activates recording 203 by dialing the proper service feature code. Called Party Switching Node 114 prepares an SS7 message, sends the CPN data to the SCP 154 which forwards the data to the third party database 170 and seizes a trunk 203A destined for Third Party Device 106. The message is then delivered 204 to Third Party Device 106, inclusive of attributes of the most recent call.

The message delivered to Third Party Device 106 includes the most recent CPN resident in CPN Register 160 and the called party's telephone number. However, the message can be configured to further include additional information, including the time of day of the call.

Once the call is delivered to Third Party Device 106, the device can leverage other facilities maintained by the third party. For example, if the third party is a jurisdictionally appropriate PSAP, it may have access to databases regarding residents. The third party device, for example, can launch its own query to a Names and Address Database 146 to match the CPN to a network subscriber.

Figure 3:
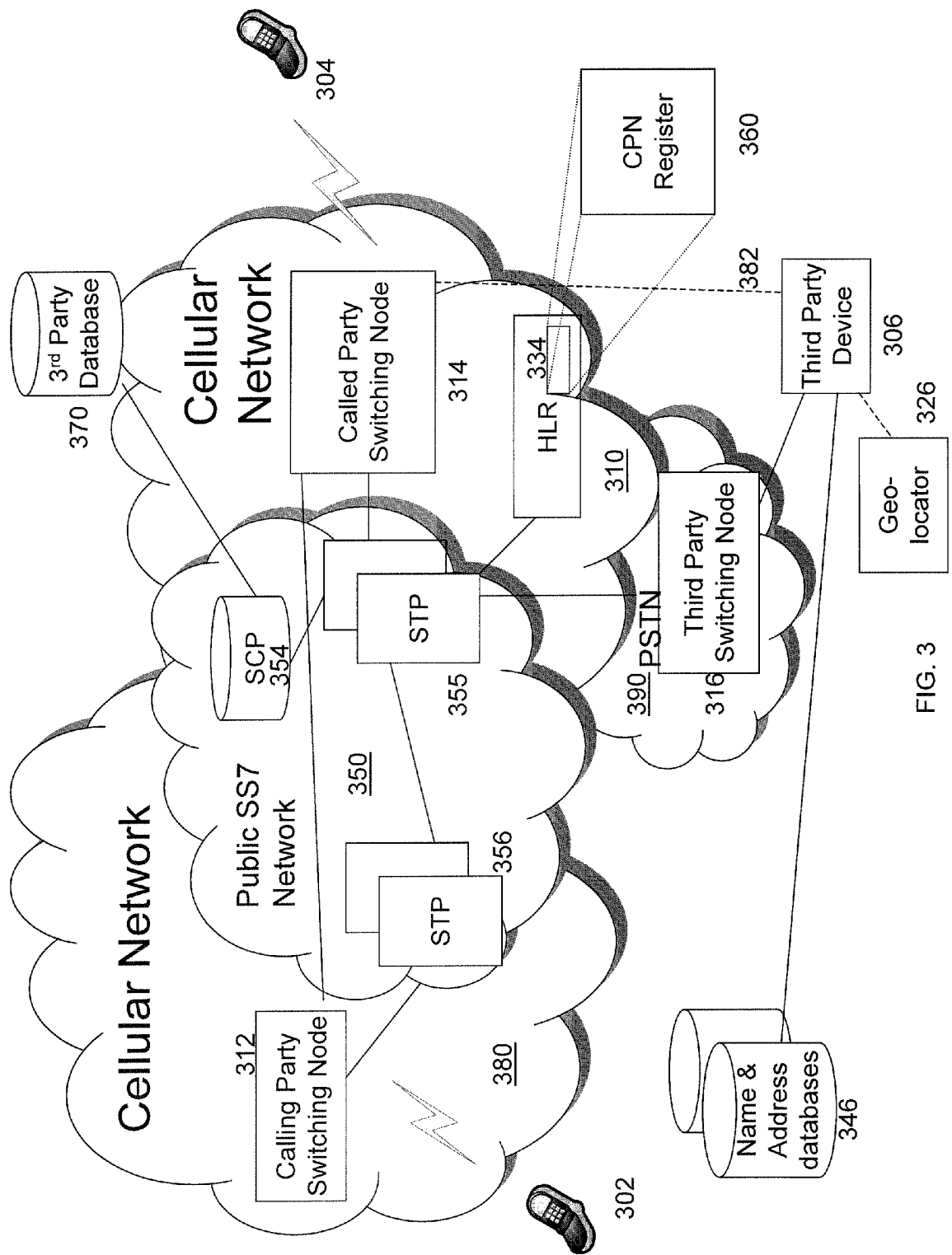
FIG. 3 illustrates embodiments of a communication system inclusive of mobile terminations.

FIG. 3 shows an example end-to-end network for a cellular to cellular call. Although shown as cellular to cellular with key network components, the reader should appreciate that FIG. 3 is provided for illustrative purposes and calls could be completed over other combinations of networks, such as but not limited to cellular to wireline and wireline to cellular or within a single wireless or wireline network. Also, although Devices 302 and 304 are shown as basic cellular telephones, either or both may be equipped for direct connectivity to a data network such as the internet. As shown in FIG. 3, the called party initiates a call using device 302 destined for device 304. Device 302 is connected to Calling Party Switching Node 312 within Cellular Network 380 and Device 304 is connected to Called Party Switching Node 314 within Cellular Network 310. As shown, Cellular Networks 380 and 310 have connectivity to the Public SS7 Network 350 and PSTN 390. As shown, Public SS7 Network 350 is comprised of a plurality of paired STPs 355 and 356 and SCP 354. STP pairs 355 and 356 may each be managed by separate service provider networks.

In addition to showing the cellular networks, FIG. 3 differs from FIG. 1 in several ways. Home Locator Register (HLR) 334 may be used to store CPN separately from Called Party Switching Node 314. In general, HLRs are commonly used in cellular networks and may be comprised of one or more registers, including CPN Register 360. In addition, Third Party Database 370 is a private database which captures and stores information generated by called parties, such as the information included in the SFC messages. It may be desirous to store all such information in a separate database, so that data searching techniques may later be employed for investigating attributes of calls, such as by performing trend analysis. Although shown as accessible from SCP 354, third party database 370 may also be accessible directly from STPs 355. Also, Geolocator 326, subtending from Third Party Switching Node 316 in PSTN 390 as shown in FIG. 3, is provided with connectivity to Third Party Device 306. In the event an unlawful communication is reported and the call originated from device 302 which is a wireless device, the third party can associate geographic information with the device.

Third Party Device 306 can accept the requisite content in any of several ways. For example, if Third Party Device 306 has the ability to serve as a node on the public SS7 network (that is, it has its own Common Channel Signaling interface), the content can be embedded in one or more SS7 messages. Alternatively or in addition, if Third Party Device 306 is internet ready, Called Party Switching Node 314 can prepare a datagram directed to Third Party Device 306 delivered over Internet line 382. If Third Party Device 306 is a smart phone or other type which includes the capability to initiate data path delivery, the data path may be initiated directly by Device 306 in place of using a PSTN connection.

Figure 4:
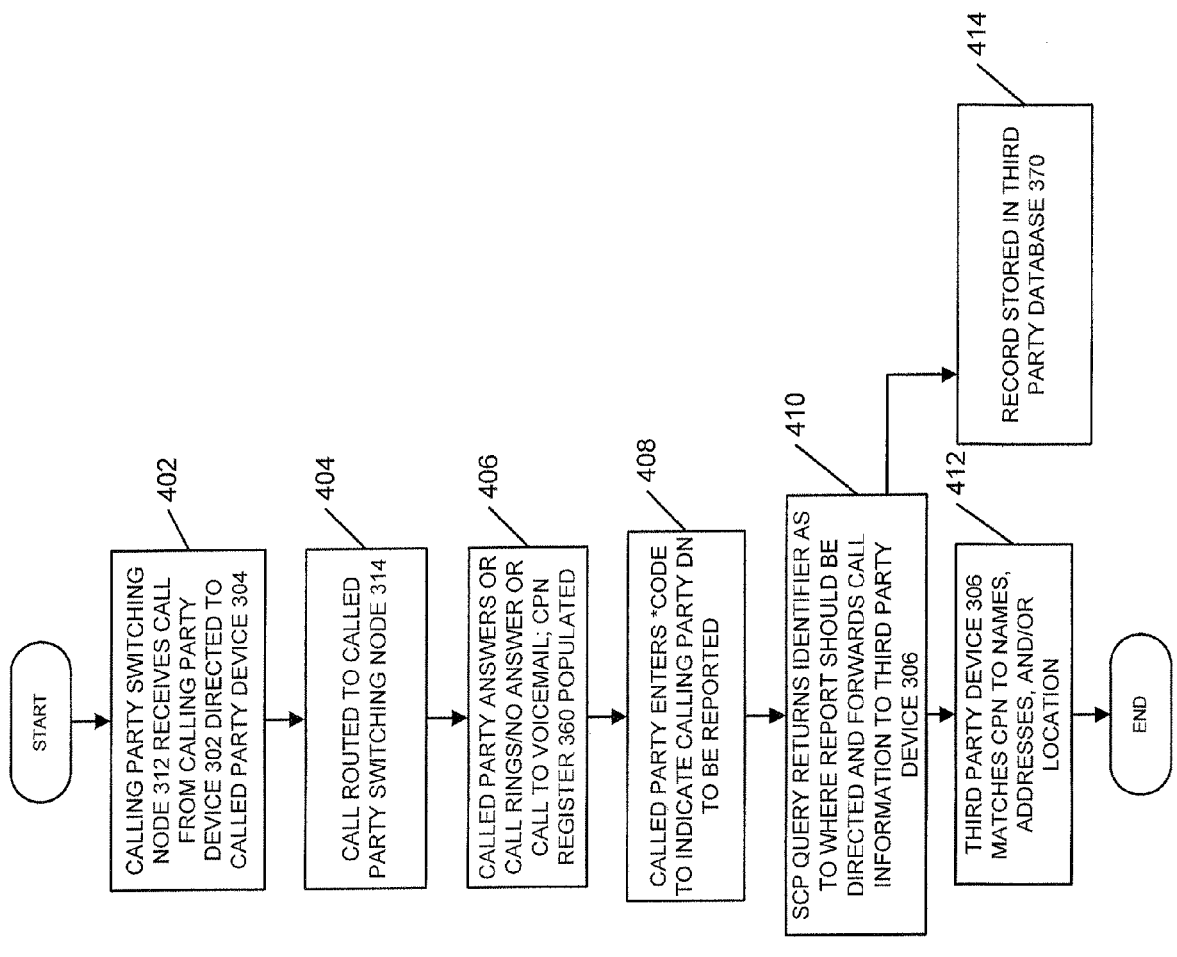
FIG. 4 illustrates an example call flow for the communication system of FIG. 3.

FIG. 4 shows a call flow involving at least one cellular device. Referring to the network shown in FIG. 3 and the flow described in FIG. 4, the consumer dials a * code, e.g., *911, to effect a report after the call is ended. In other embodiments, the consumer may elect to register a complaint concerning the calling party during the call, after reviewing a recorded message of the call or after reviewing captured information at the called device. The report may be based upon the consumer having determined that the call was received from a harasser or a marketer to whom the consumer had previously requested do-not-call treatment. Another basis for the complaint may be that the consumer may have previously entered the consumer's directory number in a do-not-call registry such as through a do-not-call registry website run by the Federal Trade Commission (FTC).

Referring to the network shown in FIG. 3 and the flow described in FIG. 4, the calling party initiates a call 402 from device 302 through Calling Party Switching Node 312, Public SS7 Network 350, to Called Party Switching Node 314 and to called party device 304. The public network, including Public SS7 network 350, routes the call 404 to Called Party Switching Node 314. Once the call is routed to device 304, CPN Register is populated (406). If the called party at device 304 wishes to report the call, the consumer dials a * code 408, e.g., *911, to effect a report after the call is ended. The consumer enters the code as a DTMF signal. Called Party Switching Node 314 formulates an SS7 message directed to SCP 354 querying where to deliver consumer's report, and, in the scenario shown, SCP 354 returns (410) the location of where Called Party Switching Node 314 should deliver the report. Alternatively, Called Party Switching Node 314 may not direct a message to SCP 354 and instead may formulate a message inclusive of CPN directly to a third party. When SCP 354 is used, SCP 354 determines where to route the report, ultimately routing to Third Party Device 306. SCP 354 may use a variety of approaches to determine routing, such as but not limited to using an Advanced Intelligent Network (AIN) trigger. Third Party Device 306 matches CPN to names, addresses, and/or locations (412). Third party database 370 (or Third Party Device 106 or 306) may receive and store the call information (414).

In an alternate embodiment, Called Party Switching Node 114 shown in FIG. 1 or Called Party Switching Node 314 shown in FIG. 3 is comprised of a switch gateway and a local switch. After a called party dials a * code, the local switch delivers the consumer's last CPN and consumer number information (e.g. 617-555-XXXX) to a switch gateway for real-time queuing to third party database 370 (or Third Party Device 106 or 306). Third party database 370 (or Third Party Device 106 or 306) receives and stores the information.

In yet another alternate embodiment shown with respect to FIGS. 1 and 3, after a called party dials a * code, Called Party Switching Node 114 or 314 delivers the called party's call detail records, which include incoming and outgoing calls to an Automatic Message Accounting (AMA) gateway comprised within Called Party Switching Node 114 or 314. Included with the call detail records are CPN and called party number information (e.g. 617-555-XXXX). The incoming and outgoing calls to AMA gateways may be * code tagged. These * code tags indicate a called party post call event. The AMA gateway delivers only CPN (e.g., 508-555-XXXX) and the called party number information (e.g. 617-555-XXXX) to third party database 370 (or Third Party Device 106 or 306) that have been tagged with the correct * code. Third party database 370 (or Third Party Device 106 or 306) receives and stores the information.

Figure 5:
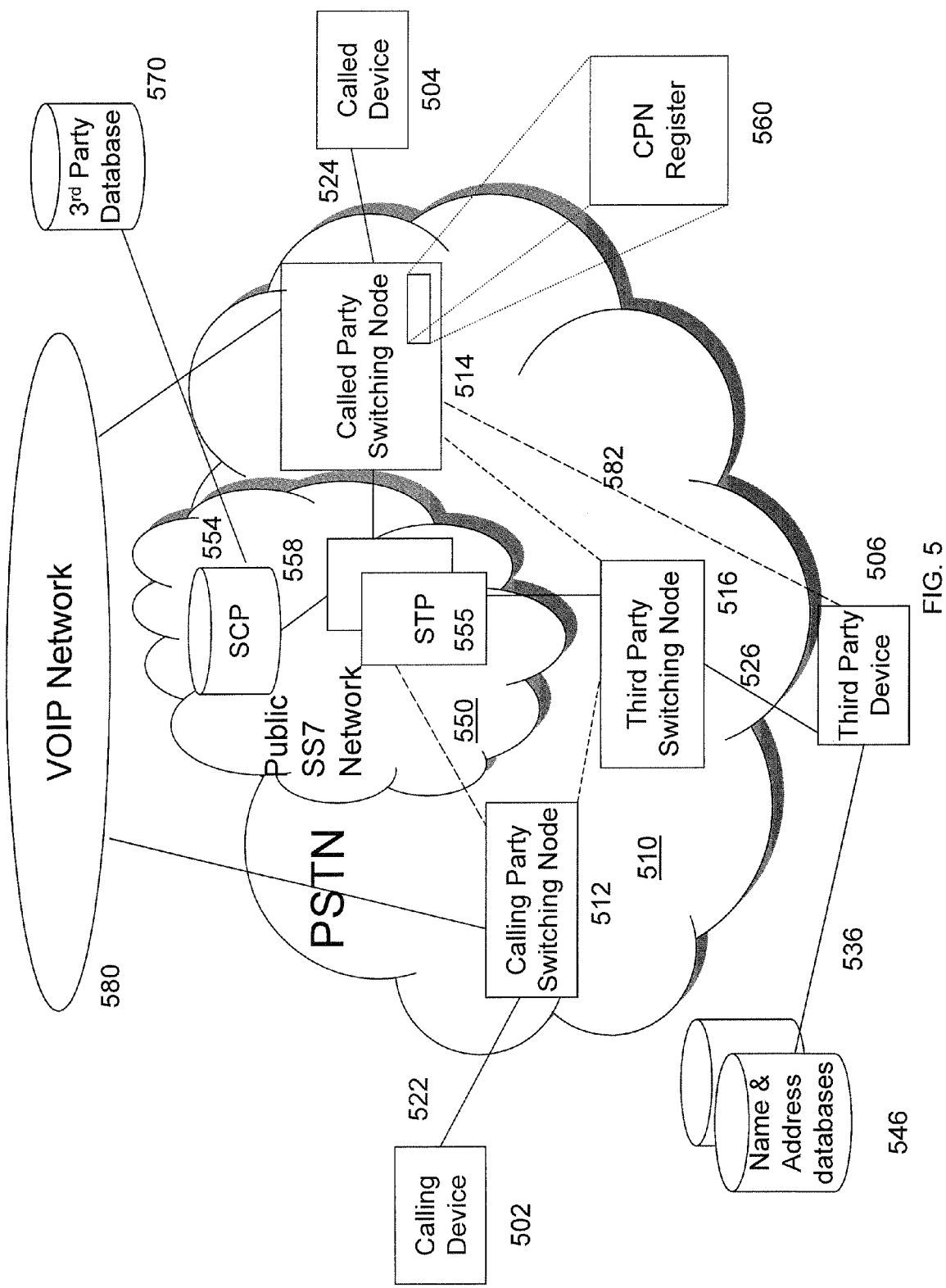
FIG. 5 illustrates embodiments of a communication system inclusive of VoIP.
Figure 6:
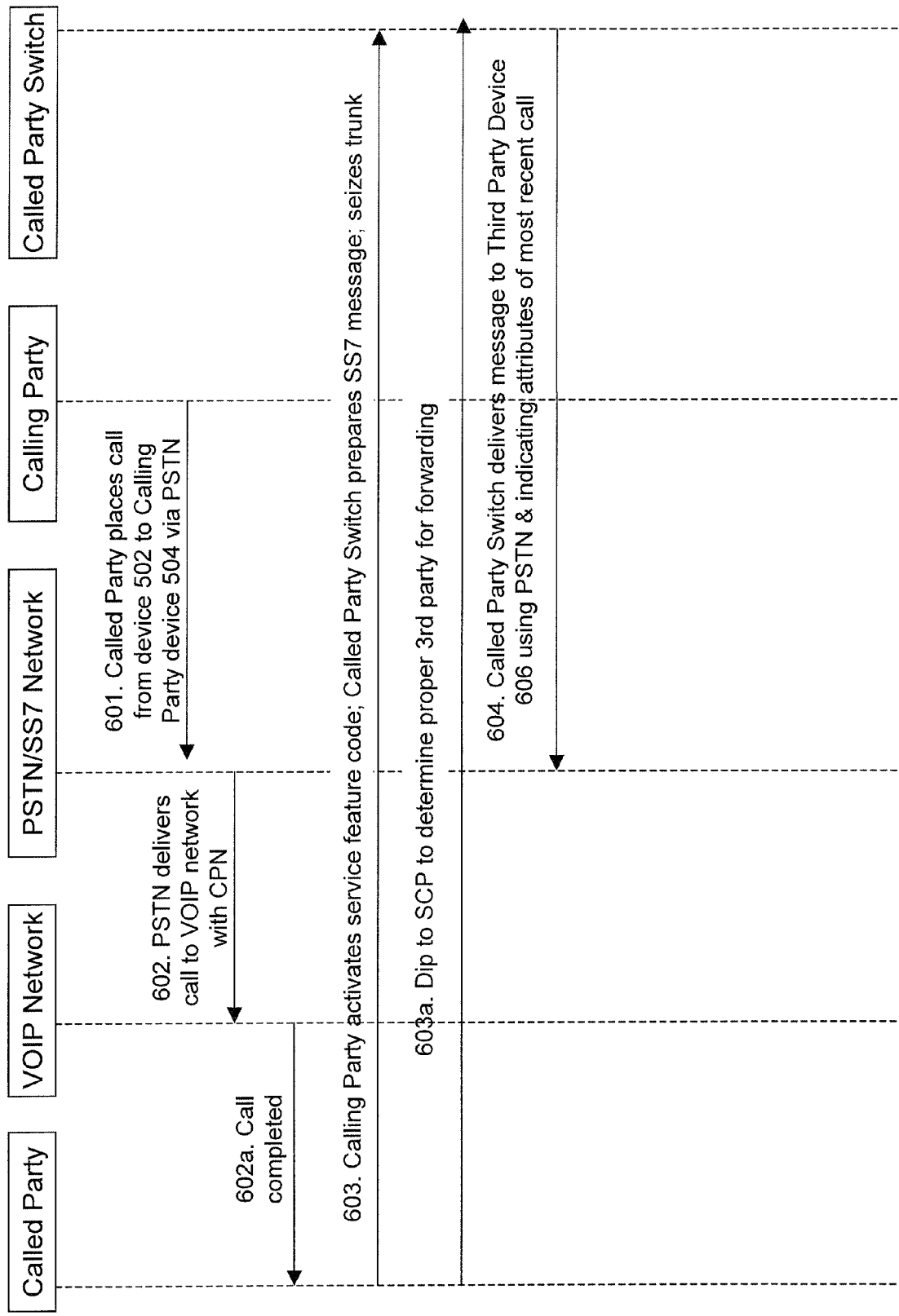
FIG. 6 illustrates an example call flow for the communication system of FIG. 5.

In the embodiment shown with respect to FIGS. 5 and 6, after a called party dials a * code, an application server in a PSTN-connected VoIP network delivers CPN to third party database 570 (or Third Party Device 106/306/506) through the PSTN. The VoIP network may also deliver the directory number of the called party (e.g., 617-555-XXXX) as well as the time and date of the call. Third party database 570 (or Third Party Device 106/306/506) receives and stores the call information. One of skill in the art will also recognize that the VoIP gateway may also communicate with third party database 570 (or Third Party Device 106/306/506) through a number of different communication networks, such as the Internet. Although shown as accessible from SCP 554, third party database 570 may also be accessible directly from STPs 555.

Referring to FIGS. 5 and 6, in the first interaction, a harasser (calling party) places a call 601 from calling device 502 to a consumer (called party) with called device 504 over PSTN 610 by dialing the called party's assigned telephone number, e.g., 617-555-XXXX. Next, the PSTN delivers the call 602/602a via VOIP Network 580 to the consumer, with CPN delivered to Called Party Switching Node 514, which is placed in CPN Register 560. Assuming the called party wishes to report the call as threatening or harassing, the called party activates recording 603 by dialing the proper service feature code. Called Party Switching Node 514 prepares an SS7 message, sends the CPN data to the SCP 554 which forwards the data to the third party database 370 and seizes a trunk 603a destined for Third Party Device 506. The message is then delivered 604 to Third Party Device 506, inclusive of attributes of the most recent call.

In addition to delivering CPN and the called party number information to third party database 170/370/570 (or Third Party Device 106/306/506), switching nodes 114 and 314 shown in FIGS. 1 and 3 may also be configured to automatically activate selective "call rejection" consistent with typical SFC provided by local exchange carriers. Typically, a called party may activate a SFC for selective "call rejection" by entering a * code (e.g., * 60) followed by a target phone number the called party would like to place on a call rejection list.

While the call examples described in connection with FIGS. 1-6 describe a consumer as the called party, it should be understood that the called party can also be a business or other entity. Likewise, the calling party, at times depicted herein as a telemarketer for illustrative purposes, can also be some other entity such as a non-telemarketer.

Figure 7:
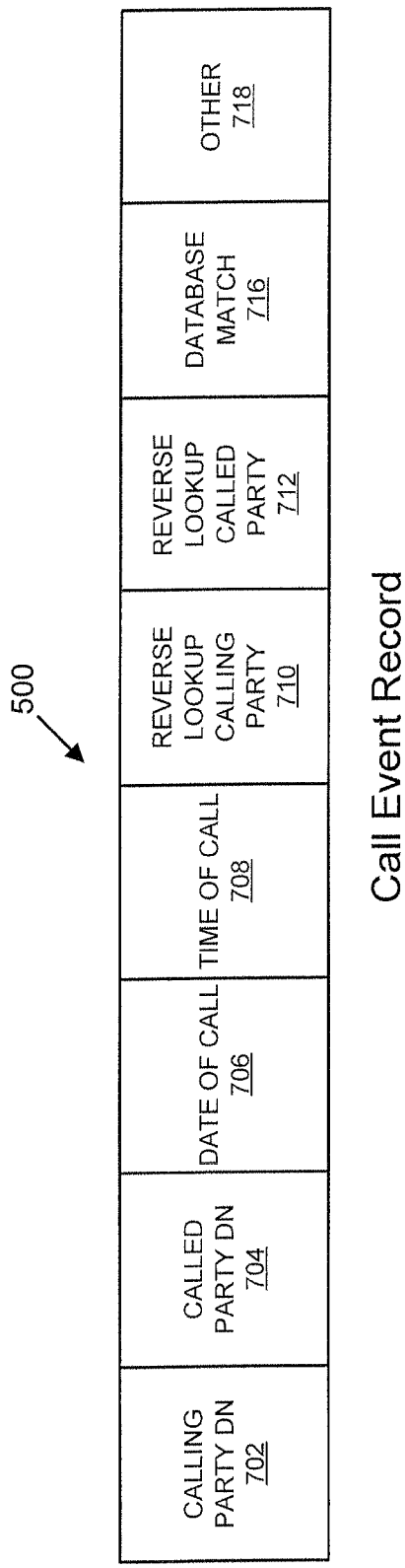
FIG. 7 illustrates a sample call event record.

An example data record 700 for storing the complaint information is shown in FIG. 7. The record 700 includes fields for calling party directory number 702, called party directory number 704, date of call 706, time of call 708, reverse lookup information for calling party 710, reverse lookup information for called party 712, database match 716, and other information 718. The reverse lookup information 710, 712 may include the name and address associated with the respective directory numbers of the calling and called parties based on, for example, entries 144 found in third party database 170 (FIG. 3). The called party complaint notes 714 may include notes entered by called party 712 through a secure web portal for accessing third party database 170 (FIG. 3). The database match 716 may indicate a commonality with other database entries, suggesting a repeat offender associated with a type of violation, e.g., federal, state or other do-not-call list. The other information field 718 may include other identifying information associated with the call, such as PSTN trunk and line equipment information. The record may be further augmented by data provided by the called party or data provided by a third party such as a law enforcement agency. For example, in the event that an internet connection was available, data could be delivered via the internet or, alternatively, by a user completing a form for entering data.

FIG. 8 illustrates a process for managing updates to the information stored on third party database 370. At 802, one or more new entries are provided to database 370. At 804, the call and associated data are analyzed to determine the call's potential unlawful nature. Database 170/370/570 is then checked for matching CPNs at 806. This may include prohibited directory numbers derived from any one or a combination of previously reported unwanted or unlawful numbers, a federal do-not-call list, a state do-not-call list, an industry-specific do-not-call list, a client internal list specific to the calling party and other defined lists. If database 370 determines at 808 that there is not a hit in the regulatory databases, the database updates its record entry at 810 with a status indicating that no hit was found. If there is a hit in the database, the database updates the record entry at 812 with a status indicating that a hit was found. The status may include an indication of the type of violation, e.g., entry on a federal do-not-call list.

At 814, the process continues with the database requesting reverse lookup information from one or more databases, such as name and address database 346 based on the respective directory numbers of the calling and called party. If database 370 determines at 816 that valid reverse lookup information is not available, the record entry is updated at 818 with a status indicating that no information was found. If there is valid information available, the record entry is updated at 820 with the reverse lookup information retrieved from the other databases, such as Name and Address database 346.

In addition, in the event that Third Party Device 106/306/506 is accessible via means in addition to telephony means (such as by FAX, email, SMS message, voice mail, etc.), the called party can provide additional detail of the unwanted or unlawful communication, such as details spoken by the caller. As Third Party Device 106/306/506 is provided with these additional details, the same update procedure can be applied.

Further, call blocking capability presently exists in the PSTN and in cellular networks. In a further embodiment of the present invention, when the called party reports the unwanted call by dialing the appropriate SFC, Called Party Switching Node 114 or 314 blocks further calls from the calling party to that called party. In still another embodiment, upon dialing the appropriate SFC, the called party is given the option to block future calls from that calling party.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

The invention claimed is:

1. A system for capturing call information comprising:
   a telephone set, smart phone, or other communications phone or device capable of delivering subscriber signaling codes and content messages;
   a stored program control switching element with a subscriber signaling code detector and a register, said switching element in the PSTN (public switched telephone network) and capable of preparing and delivering network signaling messages; and
   a customer node for receiving and decoding network signaling messages and content messages, wherein each said network signaling message includes data extracted from said register;
   wherein said stored program control switching element is programmed to accept particular customer signaling codes and in response to a customer signaling code is programmed to prepare and deliver a network signaling message directed to a customer node, said customer node having been identified to said stored program control switching element in a response to a query sent to a network accessible database and accessible via the PSTN, and said stored program control switching element is programmed to accept particular customer signaling codes following the conclusion of a call; and each of said network signaling message and said content message includes an indicator such that said customer node has the ability to associate said network signaling message and said content message.

2. The system of claim 1 wherein said data in said register is a phone number.

3. The system of claim 1 wherein said customer node includes processing and storage capability, and includes the ability to store data from a plurality of signaling messages.

4. The system of claim 1 wherein said customer node receives voice messages and is programmed to associate a voice message with a signaling message.

5. The system of claim 1 wherein said customer node receives data messages and is programmed to associate a data message with signaling message.

6. A method for reporting a call received by a telephonic device to a reporting authority, said received call originating with a calling party and terminating with a called party, comprising the steps of:

upon ending said call received by said telephonic device, using said telephonic device to send a Dual Tone Multi-Frequency (DTMF) sequence to a stored program control switching node, receipt of said sequence by said switching node resulting in said switching node requesting at least one network address for a reporting authority and directing a notification signaling message including the telephone number of said calling party obtained from a register at or accessible by said switching node, and the telephone number of the called party, to said reporting authority, and using said telephonic device to send a content message to said reporting authority using a data network, wherein said DTMF sequence indicates a characteristic of the call received, said stored program control switching node is in the PSTN (public switched telephone network) and has the ability to construct and deliver signaling messages, and said notification signaling message and said content message each includes an indicator such that said reporting authority has the ability to associate said notification signaling message and said content message and said telephonic device has the ability to deliver a content message.

7. The method of claim 6, wherein said telephonic device is a smart phone.

8. The method of claim 6, wherein said content message includes audio, video, or text.

9. The method of claim 6 wherein said notification signaling message includes the time and date of the call.

10. The method of claim 6 wherein said notification signaling message is delivered through a SS7 network.

11. The method of claim 6 wherein said notification signaling message is delivered through a mobile communications network.

12. The method of claim 11 wherein said mobile communications network is a cellular network.

13. The method of claim 6 wherein said notification signaling message is delivered using a voice over internet protocol (VoIP) network.

14. The method of claim 6 further comprising sending notification to the calling party based on a received complaint exceeding a complaint threshold.

15. The method of claim 6 further comprising delivering a voice message, prepared by said called party to said network address, wherein said voice message is associated with said notification signaling message.

16. The method of claim 6 wherein said content message is a short message service (SMS) message.

17. The method of claim 16 wherein said SMS message is delivered using the Internet.

18. The method of claim 6 further comprising blocking future received calls from said calling party to said called party.

19. The method of claim 6 further adding the telephone number of said calling party to a database, wherein said database includes calling party numbers which are blocked due to received complaints exceeding a complaint threshold.

* * * * *